United States Patent
Feng et al.

(10) Patent No.: US 8,359,624 B2
(45) Date of Patent: Jan. 22, 2013

(54) PROTOCOL FOR CONTROL OF NETWORK OR BUS ATTACHED CABLE TV SET-TOP BOX FRONT-END FUNCTIONALITY

(75) Inventors: Weimin Feng, Suwanee, GA (US); Paul McGlynn, Roswell, GA (US); David Leo Lwin, San Dimas, CA (US); David Martin Erickson, San Clemente, CA (US); Haisong Wang, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 185 days.

(21) Appl. No.: 11/710,479

(22) Filed: Feb. 26, 2007

(65) Prior Publication Data
US 2007/0220571 A1    Sep. 20, 2007

Related U.S. Application Data

(60) Provisional application No. 60/777,575, filed on Mar. 1, 2006.

(51) Int. Cl.
*H04N 7/173* (2011.01)

(52) U.S. Cl. .......... 725/131; 725/78; 725/100; 725/111; 725/112; 725/133; 725/139; 725/141; 725/151; 725/153

(58) Field of Classification Search .......... 725/110–112, 725/78, 131, 133, 139, 141, 151, 153
See application file for complete search history.

(56) References Cited

U.S. PATENT DOCUMENTS

| | | | |
|---|---|---|---|
| 6,922,845 B2 * | 7/2005 | Yap et al. | 725/141 |
| 7,322,039 B2 * | 1/2008 | Tsubouchi et al. | 725/151 |
| 2001/0052130 A1 * | 12/2001 | Yap et al. | 725/90 |
| 2003/0035442 A1 * | 2/2003 | Eng | 370/486 |
| 2004/0068754 A1 * | 4/2004 | Russ | 725/131 |
| 2004/0075642 A1 * | 4/2004 | Kisliakov | 345/156 |
| 2004/0111744 A1 * | 6/2004 | Bae et al. | 725/38 |
| 2004/0181800 A1 * | 9/2004 | Rakib et al. | 725/25 |
| 2004/0230997 A1 * | 11/2004 | Kaylani | 725/111 |
| 2005/0027948 A1 * | 2/2005 | Marlan et al. | 711/150 |
| 2005/0034165 A1 * | 2/2005 | Kang et al. | 725/111 |

(Continued)

FOREIGN PATENT DOCUMENTS

EP    1478172 A1    11/2004

(Continued)

OTHER PUBLICATIONS

Search Report for European Application No. 07004089.4 dated Nov. 2, 2009, 8 pages.

*Primary Examiner* — Pankaj Kumar
*Assistant Examiner* — Mulugeta Mengesha
(74) *Attorney, Agent, or Firm* — Sterne, Kessler, Goldstein & Fox PLLC

(57) ABSTRACT

A processor for a cable television set-top box has an interface for coupling the processor to a second processor. The processor also has a port that is coupleable to control a tuner, a demodulator and a DOCSIS module with or without DSG support. The tuner has an output coupled to the demodulator input, and the demodulator has an output to the DOCSIS module input. The demodulator's output is also coupled to a conditional access module controlled by the second processor. The processor issues commands via the port to control at least one of the tuner and the demodulator based on instructions received via the interface from the second processor.

22 Claims, 9 Drawing Sheets

U.S. PATENT DOCUMENTS

| | | | |
|---|---|---|---|
| 2005/0034166 A1* | 2/2005 | Kim et al. | 725/119 |
| 2006/0031895 A1* | 2/2006 | Kwon et al. | 725/100 |
| 2007/0056005 A1 | 3/2007 | Kwon et al. | |
| 2007/0140298 A1 | 6/2007 | Eng | |
| 2008/0134278 A1* | 6/2008 | Al-Karmi | 725/141 |

FOREIGN PATENT DOCUMENTS

| | | |
|---|---|---|
| EP | 1505835 A1 | 2/2005 |
| EP | 1624669 A2 | 2/2006 |
| KR | 20030071072 A | 9/2003 |
| WO | WO 01/74079 A1 | 10/2001 |

* cited by examiner

PROTOCOL FOR CONTROL OF NETWORK OR BUS ATTACHED CABLE TV SET-TOP BOX FRONT-END FUNCTIONALITY

CROSS REFERENCE TO RELATED APPLICATIONS

This application claims benefit of U.S. Provisional Patent Application No. 60/777,575, filed on Mar. 1, 2006, which is incorporated by reference herein in its entirety.

FIELD OF THE INVENTION

The present invention generally relates to a set-top box for cable television and more specifically to control of a front-end circuit in the set-top box.

BACKGROUND OF THE INVENTION

In a traditional cable TV set-top box design, both a front-end circuit and a back-end circuit are controlled by a single central processor. Control of a tuner and a demodulator by the processor is achieved by direct register access via a parallel or a serial bus. Technology evolved such that the front-end circuit became very complicated. One central processor is not capable of simultaneously controlling front-end circuits for Data Over Cable Service Interface Specification (DOCSIS) communication and back-end circuits for cable TV functions.

Thus, a conventional set-top box was designed that provides DOCSIS service with a DOCSIS-dedicated processor connected to a single DOCSIS-dedicated tuner and a single DOCSIS-dedicated demodulator. The conventional set-top box provides CATV service with a CATV-dedicated processor connected to a separate, CATV-dedicated tuner and a separate, CATV-dedicated demodulator. Thus, in the conventional set-top box, circuits providing both DOCSIS and CATV services do not share tuners and demodulators. Further, in a conventional set-top box providing both DOCSIS and CATV service, DOCSIS and CATV processors do not share control of tuners and demodulators, nor do the DOCSIS and CATV processors communicate with each other to share control of their respective tuners and demodulators.

Thus, what is needed is a control circuit configuration and communication protocol that are capable of simultaneously controlling the DOCSIS front-end and the back-end circuit as well as overcome other shortcomings stated above.

BRIEF SUMMARY OF THE INVENTION

In an embodiment, a set-top box is configured to interface with a communications medium. The set-top box has a front-end portion coupled to a back-end portion. The front-end portion has an input and an output coupled to the communications medium. The front-end portion also has a plurality of front-end circuits configured to receive and transmit signals over the communications medium. In addition, the front-end portion has a first processor configured to control the front-end circuits. The back-end portion has a plurality of back-end circuits configured to process baseband signals that correspond to the transmit and receive signals of the front-end portion. The back-end portion also has a second processor configured to control the back-end circuits and to provide instructions to the first processor for controlling the front-end circuits.

In another embodiment, a first processor for a cable television set-top box has an interface for coupling the first processor to a second processor for specific processes. The processor also has a port that is coupleable to control both a tuner and a demodulator. The tuner has an output coupled to the demodulator, the demodulator has an output coupled to the DOCSIS/DSG module input as well as a Conditional Access module input. The processor controls the tuner and the demodulator by issuing commands via the port, based on instructions received via the interface.

Additional features and advantages of the invention are set forth in the description that follows, and in part are apparent from the description, or may be learned by practice of the invention. The advantages of the invention are realized and attained by the structure and particularly pointed out in the written description and claims hereof as well as the appended drawings.

Both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

The invention is described with reference to the accompanying drawings. The drawing in which an element first appears is typically indicated by the leftmost digit(s) in the corresponding reference number.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims.

The embodiment(s) described and references in the specification to "one embodiment," "an embodiment," "an example," etc., indicate that the embodiment(s) described may include a particular feature, structure, or characteristic. However, every embodiment may not necessarily include the particular feature, structure, or characteristic. Moreover, such phrases are not necessarily referring to the same embodiment. When a particular feature, structure, or characteristic is described in connection with an embodiment, it is understood that it is within the knowledge of one skilled in the art to effect such feature, structure, or characteristic in connection with other embodiments, whether or not explicitly described.

Overview

As used herein, the term "downstream" refers to information transmission in a direction from a head-end to a set-top box for cable TV. The term "upstream" refers to information transmission in a direction from the set-top box to the head-end.

Data Over Cable Service Interface Specification (DOCSIS) refers to a group of specifications published by CableLabs® that define industry standards for cable headend and cable modem equipment. In part, the DOCSIS specification establishes requirements and objectives for various aspects of cable modem systems including operations support systems, management, data interfaces, as well as network layer, data link layer, and physical layer transport for data over cable systems. The current version of the DOCSIS interface specification, version 3.0, as well as the DOCSIS set-top gateway specification, CM-SP-DSG-I09-061222, are incorporated by reference herein in their entirety.

Figure 1:
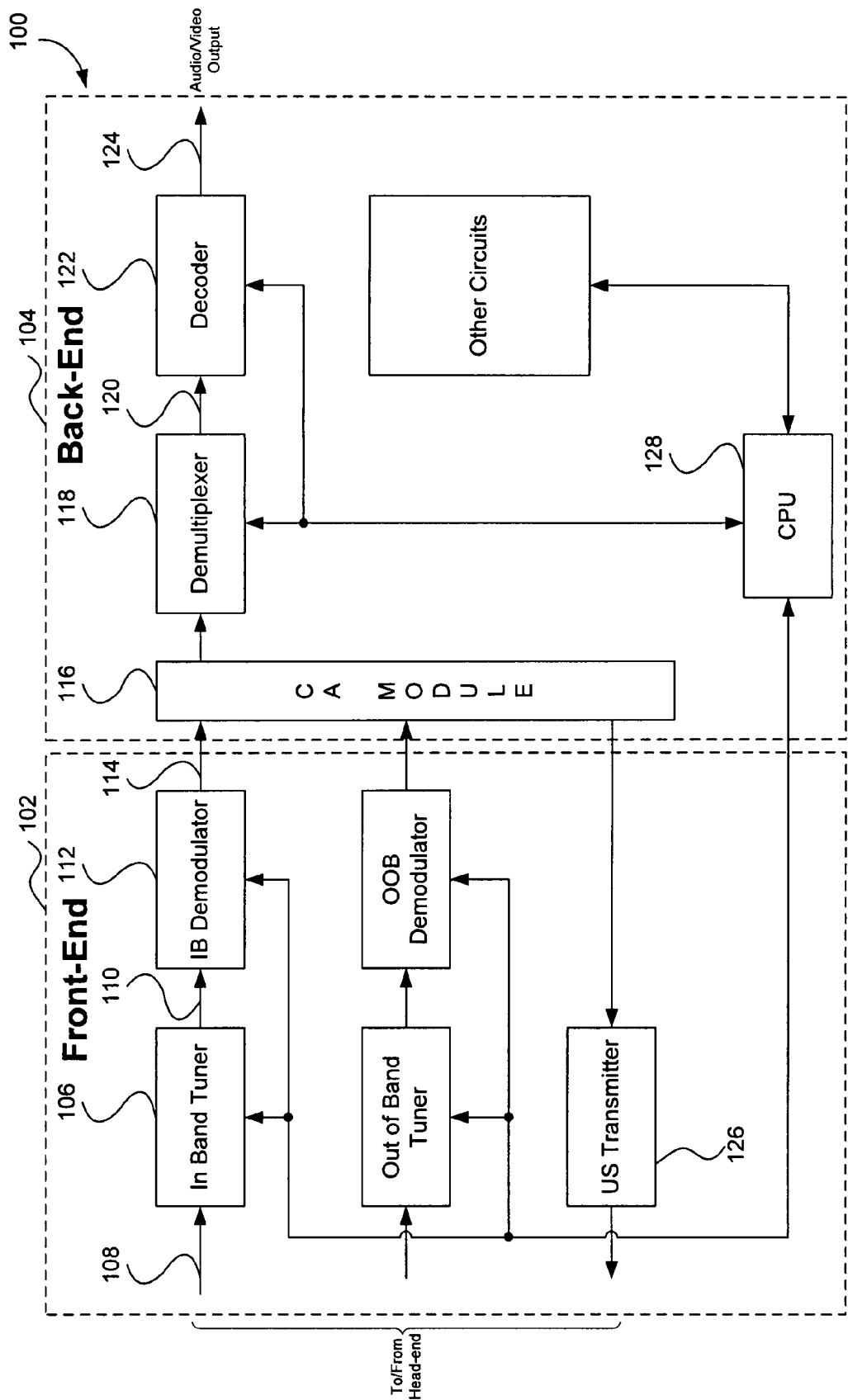
FIG. 1 illustrates a set-top box having a single central processor.

FIG. 1 depicts a conventional cable TV set-top box 100. This design has a front-end circuit 102 and a back-end circuit 104. In the front-end 102, a radio frequency (RF) tuner 106 receives an RF input signal 108 having a plurality channels having exemplary bandwidths of 6-8 MHz. The RF tuner 106 selects a desired channel (or channels) from an RF input signal 108 and down-converts the desired channel to an intermediate frequency (IF) signal 110. A demodulator 112 converts the IF signal from the RF tuner 106 to a digital bit stream output 114. The digital bit stream output 114 is coupled to the back-end circuit 104.

In the back-end circuit, a conditional access (CA) module 116 descrambles the digital bit stream output 114. A demultiplexer 118 selects a user-desired audio and video program stream output 120, and feeds it to a decoder 122. The decoder 122 decodes the audio and video to produce a decoder output 124. The CA module 116 also uses an out-of-band (OOB) downstream channel and an upstream (US) transmitter 126 to communicate with a head-end provisioning server. Every operation in the conventional cable TV set-top box 100 is controlled by a single central processor (CPU) 128.

Figure 2:
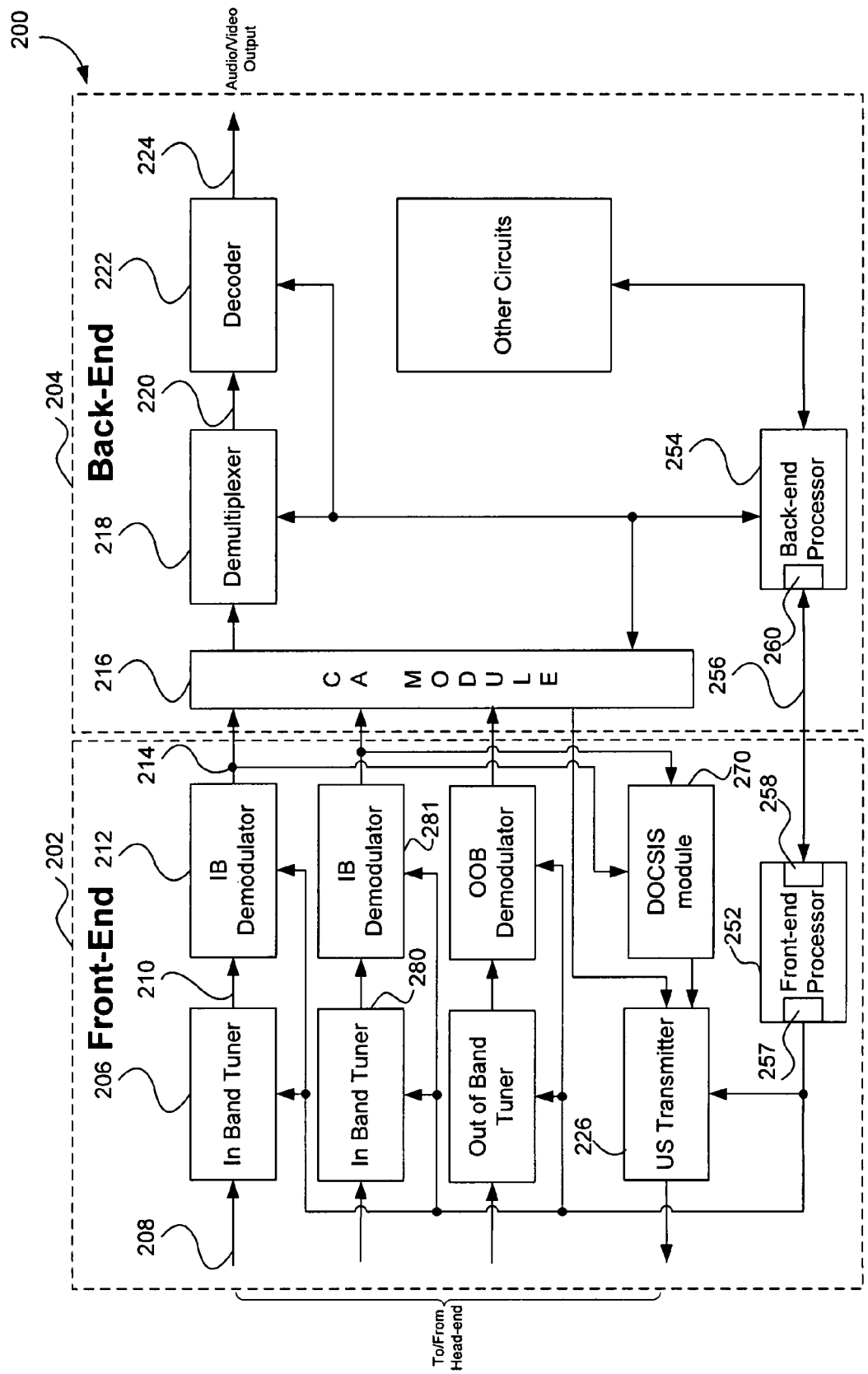
FIG. 2 illustrates a set-top box having multiple processors and Data Over Cable Service Interface Specification (DOCSIS) capability.

There is a need for a set-top box that has a front-end processor to control DOCSIS-compatible circuits and a back-end processor to control cable-TV circuits. FIG. 2 is a block diagram of a cable TV set-top box 200 with multiple processors that also supports DOCSIS service in addition to cable TV service. The two processors are a front-end processor 252 and a back-end processor 254. The cable TV set-top box 200 has a front-end circuit 202 and a back-end circuit 204. In the front-end 202, a radio frequency (RF) tuner 206 receives an RF input signal 208 having a plurality channels with exemplary bandwidths of 6-8 MHz. The RF tuner 206 selects a desired channel (or channels) from the RF input signal 208 and down-converts the desired channel to an intermediate frequency (IF) signal 210. A demodulator 212, such as a quadrature amplitude modulation (QAM) demodulator, converts the IF signal to a digital bit stream output 214. The digital bit stream output 214 is coupled to the back-end circuit 204 and a DOCSIS module 270 input for subsequent processing.

Multiple tuners and demodulators, such as the first tuner 206 and the second tuner 280, the first demodulator 212 and the second demodulator 281, support simultaneous operation of cable television service and DOCSIS service. For example, the first tuner 206 and the first demodulator 212 support DOCSIS service while the second tuner 280 and the second demodulator 281 support cable television service. In a further example, in a set-top box having three tuners, one tuner may be allocated for DOCSIS service and two tuners allocated for cable TV service. Alternatively, two tuners may be allocated for DOCSIS service and one tuner allocated for cable TV service. Thus, multiple tuners and multiple demodulators may also be coupled to the DOCSIS module 270 and controlled by the front-end processor 252 when DOCSIS downstream channel bonding is enabled in the data-over-cable system.

In the back-end circuit 204, a conditional access (CA) module 216 descrambles the digital bit stream output 214 and feeds it to a demultiplexer 218. The demultiplexer 218 selects an audio and video program stream output 220, and feeds it to a decoder 222. The decoder 222 decodes the audio and video to produce a decoder output 224. The CA module 216 also uses an out-of-band (OOB) downstream channel and an upstream transmitter 226 to communicate with a head-end provisioning server.

In the cable TV set-top box 200, the back-end processor 254 shares control of circuits in the front-end 202 with the front-end processor 252. The front-end processor 252 controls circuits in the front-end 202 by issuing commands via a port 257 both independently and based on instructions received from the back-end processor 254 via a front-end processor interface 258. The back-end processor 254 communicates the instructions to the front-end processor 252 via a data link 256.

The data link 256 provides a path for communication of information, such as data, messages, and transactions between multiple processors over a communication medium. The data link 256 couples the front-end processor 252 to the back-end processor 254 via the front-end processor interface 258 and the back-end processor interface 260. The data link 256 may be a network, such as Ethernet, or a high speed bus, such as a universal serial bus (USB). The data link 256 may be compatible with at least one of a user datagram protocol (UDP), a transmission control protocol (TCP), an internet protocol (IP), and a point-to-point protocol over Ethernet (PPPoE). Alternatively, other network protocols may run on top of the data link 256.

The front-end processor 252 may be deposited on a common substrate with at least one other circuit in the front-end 202. Similarly, the back-end processor 254 may be deposited on a common substrate with at least one other circuit in the back-end 204.

Figure 3:
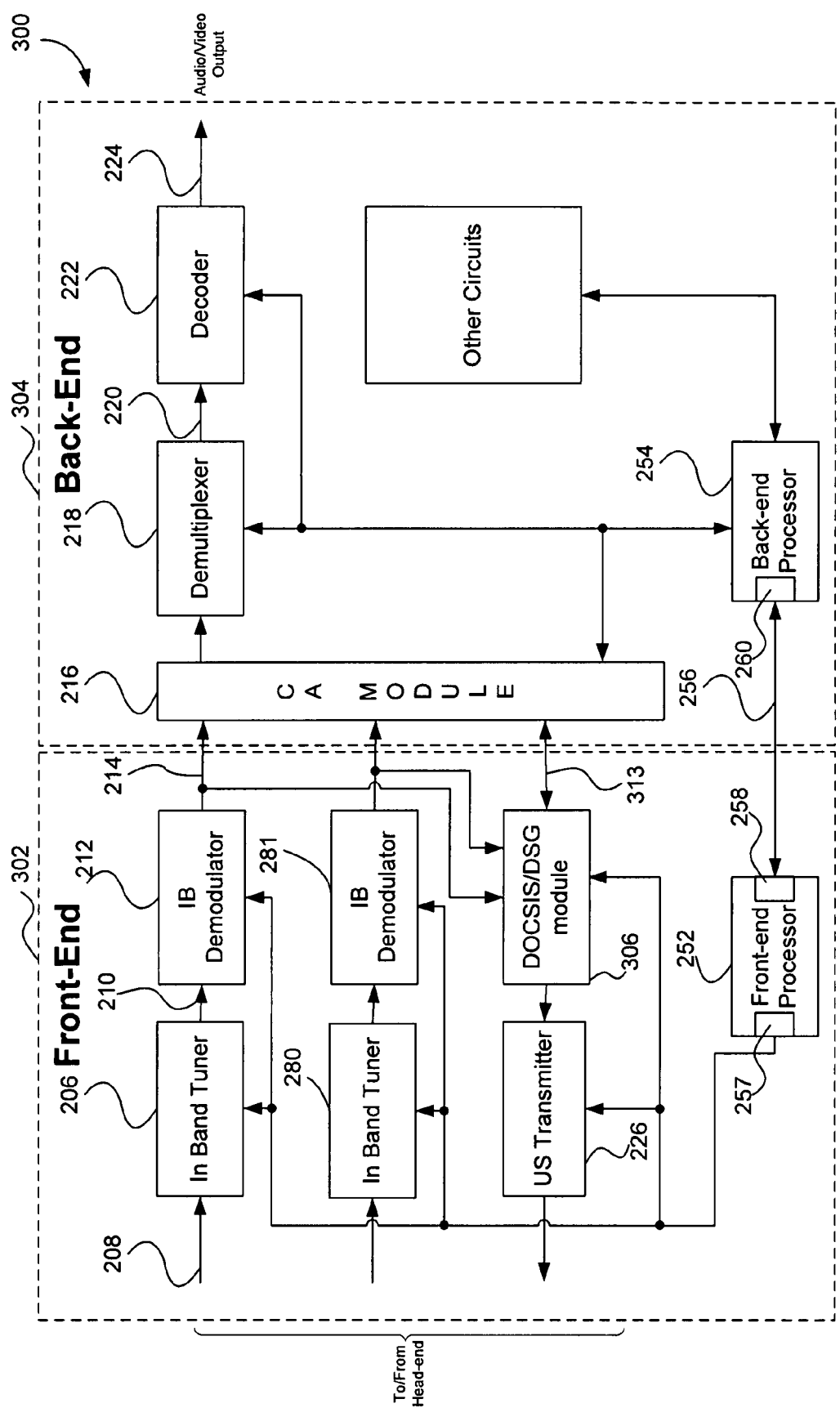
FIG. 3 illustrates a set-top box having multiple processors, DOCSIS capability and DOCSIS Set-top Gateway (DSG) capability.

FIG. 3 is a block diagram of a cable TV set-top box 300 with multiple processors that also provides DOCSIS data service. In addition, it supports DSG functionality, which enables the set-top box to communicate with a headend provisioning server through DOCSIS, therefore eliminating the need for an out-of-band (OOB) downstream tuner and demodulator. This design has a front-end circuit 302 and a back-end circuit 304. In one configuration, the cable TV set-top box 300 supports a data service and set-top control service via a DOCSIS/DSG module 306. The cable TV set-top box 300 has a front-end processor 252 that controls the DOCSIS/DSG module 306 and at least one tuner, such as the tuner 206 or a second tuner 280, and at least one demodulator, such as the demodulator 212 or a second demodulator 281, coupled to the DOCSIS/DSG module 306, that supports DOCSIS and DSG service.

Likewise to FIG. 2, FIG. 3 has multiple tuners and demodulators, such as the first tuner 206 and the second tuner 280, first demodulator 212 and the second demodulator 281, which support simultaneous operation of cable television service and DOCSIS service. For example, the first tuner 206 and the first demodulator 212 support DOCSIS service while the second tuner 280 and the second demodulator 281 support cable television service. Multiple tuners and multiple demodulators may also be coupled to the DOCSIS module 270 and controlled by the front-end processor 252 when DOCSIS downstream channel bonding is enabled in the data-over-cable system. In addition, the DOCSIS/DSG module 306 provides service for the set-top box 300 to communicate with head-end provisioning server.

In the cable TV set-top box 300, the back-end processor 254 shares control of front-end circuits, such as the tuner 206, 208 and the de-modulator 212, 281, with the front-end processor 252. The front-end processor 252 controls the front-end circuits via a port 257 both independently and based on an instruction received via a front-end processor interface 258. The back-end processor 254 communicates instructions to the front-end processor 252 via the data link 256.

In an example, the tuner 206 and demodulator 212 serve the back-end 304. The second tuner 280 and a second demodulator 281 serve the DOCSIS/DSG module 306. The data link 256 between the front-end processor 252 and the back-end processor 254 is an Ethernet network. The back-end processor 254 uses the data link 256 to communicate with the front-end processor 252 in order to control the tuner 206 and demodulator 212. For example, the back-end processor 254 may instruct the front-end processor 252 to change a channel of the tuner 206. The CA module 216 uses the DOCSIS/DSG module 306 to communicate with head-end provisioning server. Communication via the data link 256 may comply with a remote front-end control protocol described herein.
Remote Front-End Control Protocol There is a need for communication between the front-end processor 252 and the back-end processor 254. This communication is necessary for the back-end processor 254 to control cable TV-related circuits located in the front-end 202, 302, such as a tuner 206. The communication need calls for a protocol that meets three requirements: The protocol must enable the back-end processor 254 to control at least some front-end processor functions, such as tuning a tuner 206 to a frequency or instructing a demodulator 212 to acquire a QAM channel. The protocol should be simple and not require lengthy code so it can be easily implemented in an embedded environment. The protocol should also be media-independent for use with different data links between the front-end processor 252 and the back-end processor 254.

It is possible to adopt some existing protocols such as Remote Procedure Call (RPC) and Simple Object Access Protocol (SOAP) to enable communication between the front-end processor 252 and the back-end processor 254. However, these protocols depend on other network protocols such as Internet Protocol (IP) and Hyper Text Transfer Protocol (HTTP). In a situation where IP service is not available, such as when connecting both processors with USB, these protocols will not work. Also, these protocols are not designed specifically for front-end control in an embedded environment, adopting them will introduce overheads such as External Data Representation (XDR) and Extensive Markup Language (XML) support, which will increase the code footprint and increase system complexity unnecessarily. Finally, RPC and SOAP are not readily supported on some operating systems, therefore their applicability is limited.

Figure 4:
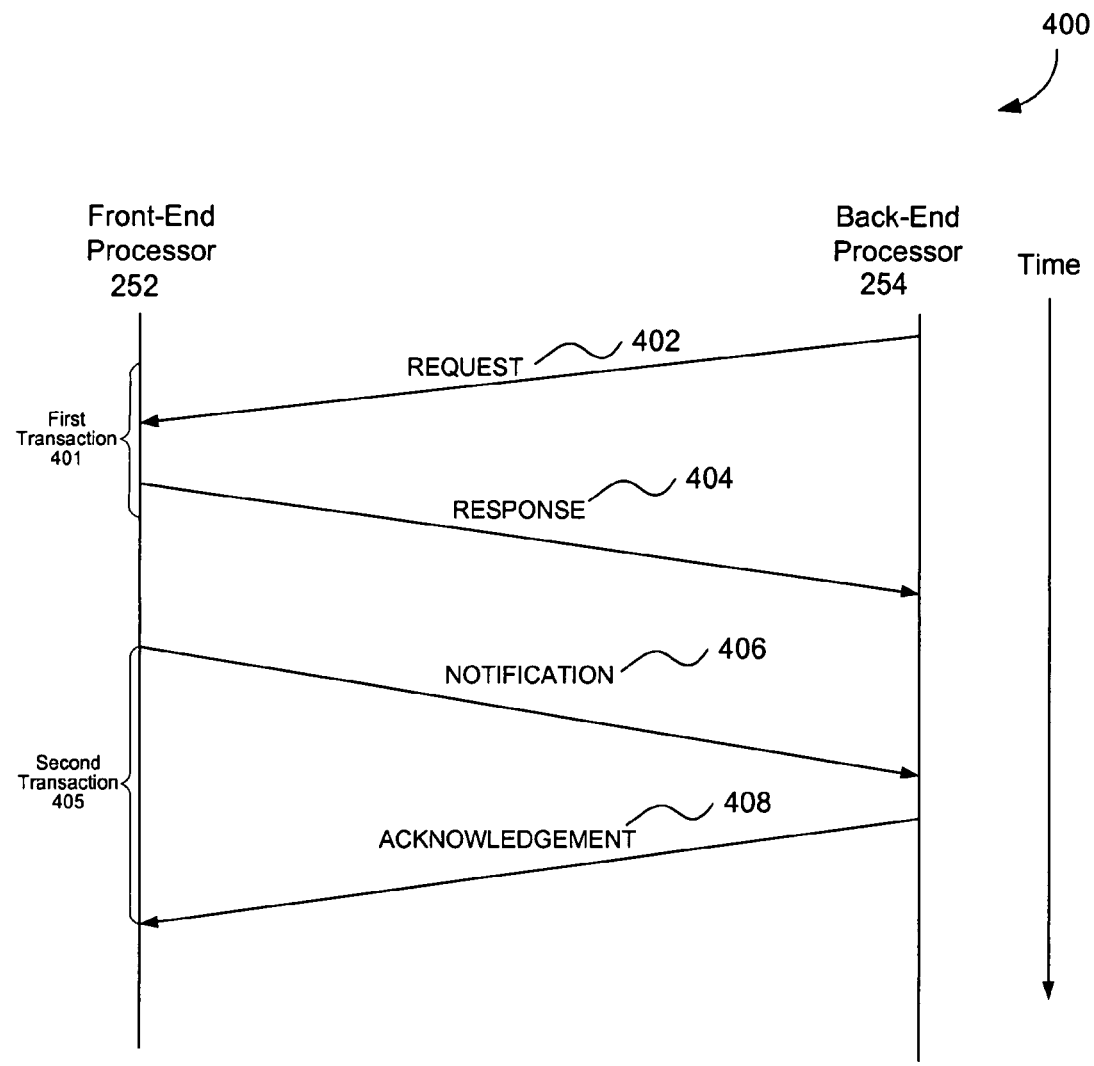
FIG. 4 shows exemplary transactions between two processors.

As shown in FIG. 4, the remote front-end control protocol defines types of point-to-point transactions 400 between the front-end processor 252 and the back-end processor 254. A first point-to-point transaction 401 has a request message 402 and a response message 404. The back-end processor 254 initiates the first point-to-point transaction 401 by sending the request message 402 to the front-end processor 252. The request message 402 requests an operation be performed by the front-end processor 252. The front-end processor 252 carries out the operation after receiving the request message 402, and then sends a response message 404 to the back-end processor 254.

A second point-to-point transaction 405 has a notification message 406 and an acknowledgement message 408. The front-end processor 252 initiates the second point-to-point transaction 405 by sending the notification message 406 to the back-end processor 254. The notification message 406 indicates that an event has taken place in a front-end circuit 202, 302. The back-end processor 254 acknowledges reception of the notification message 406 by sending the acknowledgement message 408 to the front-end processor 252.

The remote front-end control protocol also defines a format of the messages discussed herein. The message format consists of a fixed-length message header and a variable length message body. Information carried in the message body is operation or notification specific. Also defined are a set of operations and notifications between the front-end processor 252 and the back-end processor 254. An operation includes an operation ID and related operation parameters. A notification includes a device ID and related event data. Message transport, message format, reliability, and flow control are also defined by the remote front-end control protocol. The remote front-end control protocol also details specific mappings when using User Datagram Protocol (UDP) or USB for message transport.

The following sections explain the remote front-end control protocol in detail. A first section illustrates transaction processing in the front-end processor 252 and the back-end processor 254. A second section describes a message format, supported operations, and a related data structure. A third section describes reliability, flow control and a data transport service used with the remote front-end control protocol. A forth section illustrates an exemplary sequence of transactions.

(a) Transaction Processing

Figure 5:
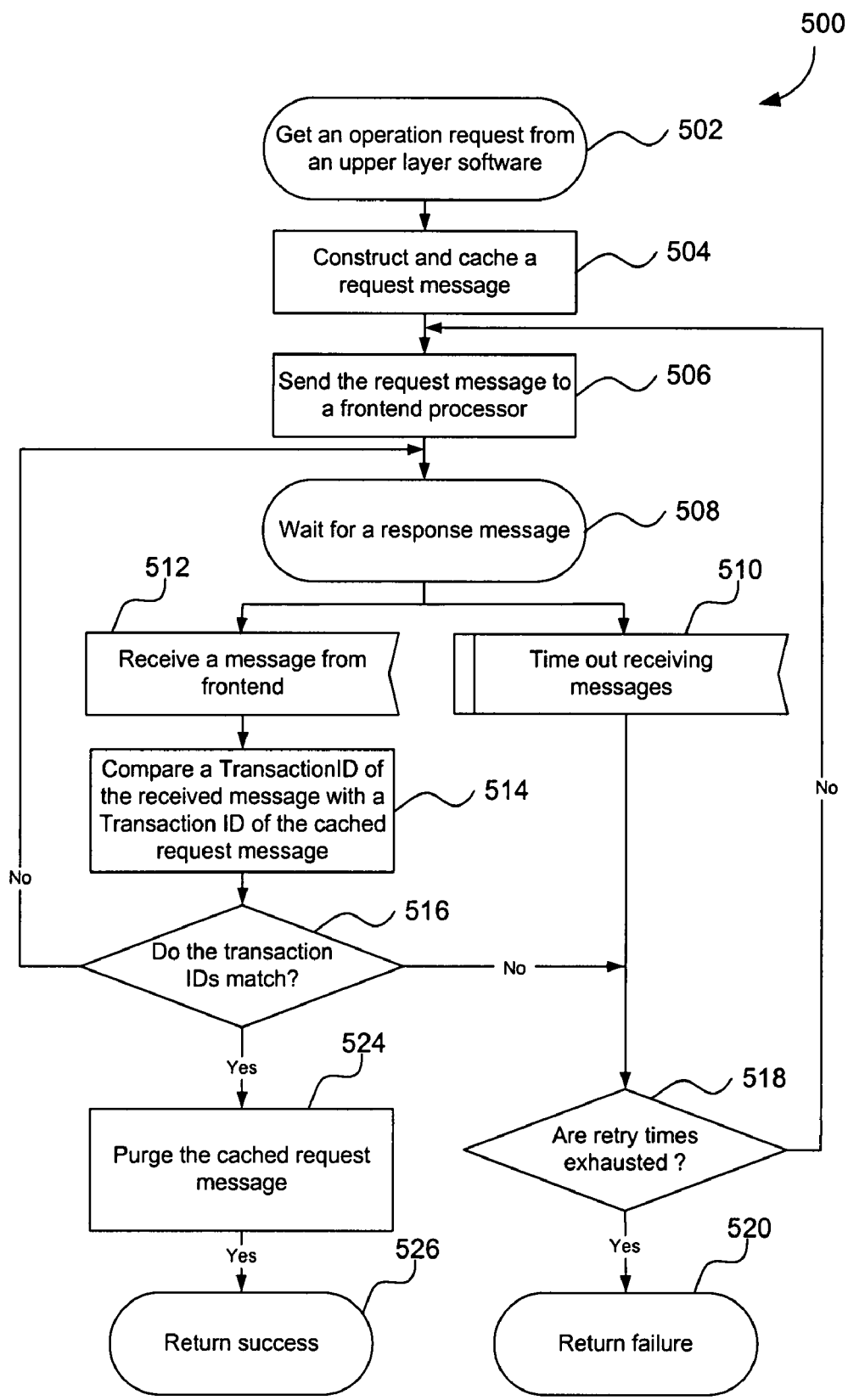
FIG. 5 is a flowchart of a back-end processor send request process.

FIG. 5 is a flowchart of a request process 500 in the back-end processor 254. In step 502, an operation request is received from upper layer software. In step 504, the request process 500 constructs and caches a request message 402. The request message 402 contains a randomly generated transaction ID that is used to identify the transaction. In step 506, the request process 500 sends the request message 402 to the front-end processor 252 via the data link 256. In step 508, the back-end processor 254 waits for a response for predetermined period of time. In step 510, the back-end processor 254 will timeout after the period of time passes.

In step 512, the back-end processor 254 receives the response message 404. In step 514, the request process 500 parses the response message 404 and checks if the transaction ID in the response message 404 matches the transaction ID for the outstanding request message 402. In step 516, if there is a match, the cached message is purged in step 524 and the transaction is successfully completed, and a success status will be returned to the upper layer in step 526. In step 516, if there is no match, the request process 500 discards the received response message 404 and waits until timeout occurs or reception of another response message 404. If there is a timeout, the request process 500 will try to resend the cached request message 402. There is a fixed number of retries. In step 518, if the request process 500 has exhausted the number of retries, a failure status will be returned to the upper layer in step 520.

Figure 6:
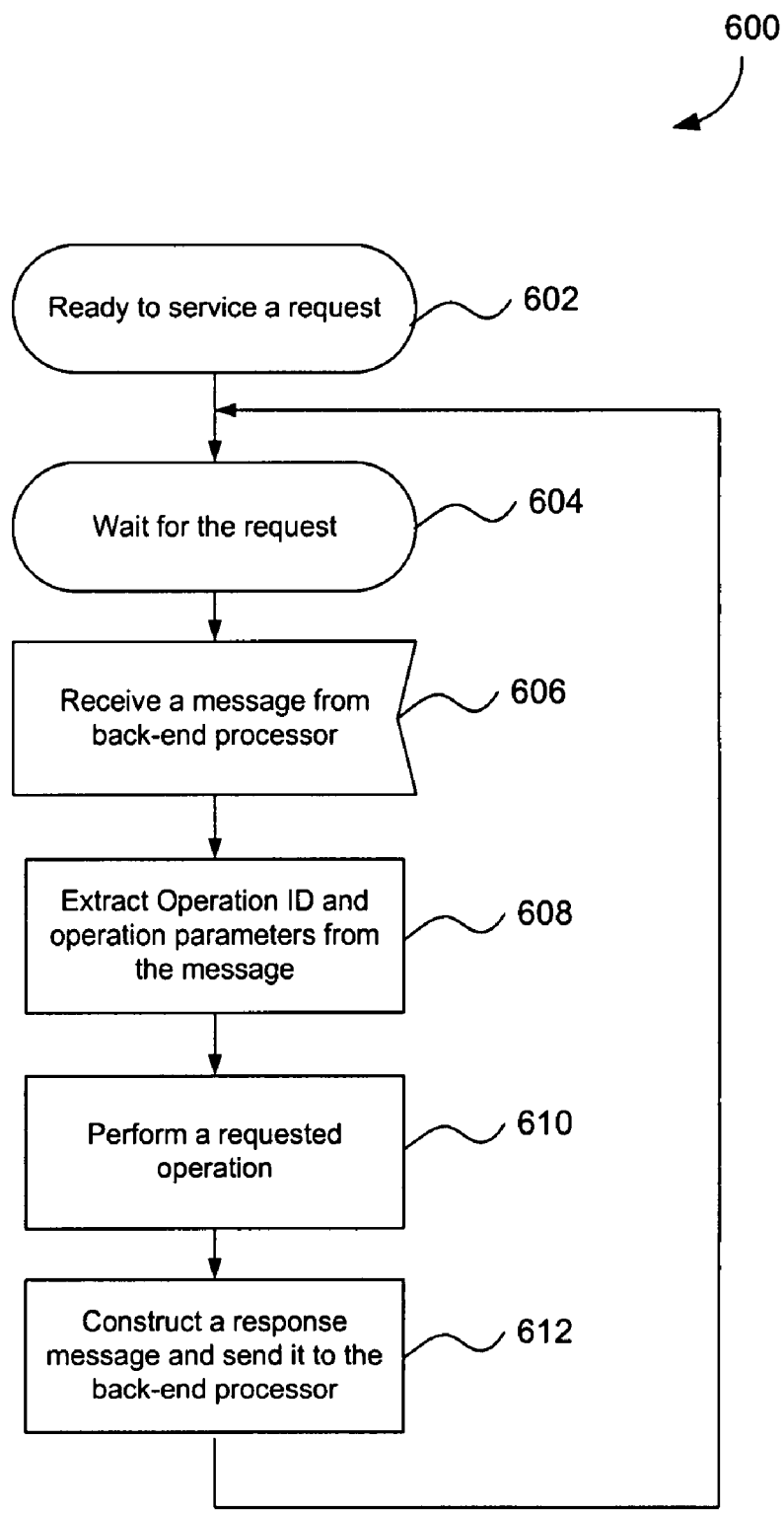
FIG. 6 is a flowchart of a front-end processor receive request process.

FIG. 6 is a flowchart of a receive request process 600 in the front-end processor 252. In step 602, the receive request process 600 is ready to service a request. In step 604, the front-end processor 252 loops while awaiting the request message 402 from the back-end processor 254. In step 606, the front-end processor 252 receives a message from the back-end processor 254. In step 608, upon receiving the request message 402, the front-end processor 252 parses the received request message 402 and extracts the Operation ID and operation parameters from the request message 402. In step 610, the front-end processor 252 performs the requested operation. In step 612, the front-end processor 252 constructs and sends the response message 404 to the back-end processor 254 via the data link 256. The response message 404 contains the same transaction ID as the request message 402.

Figure 7:
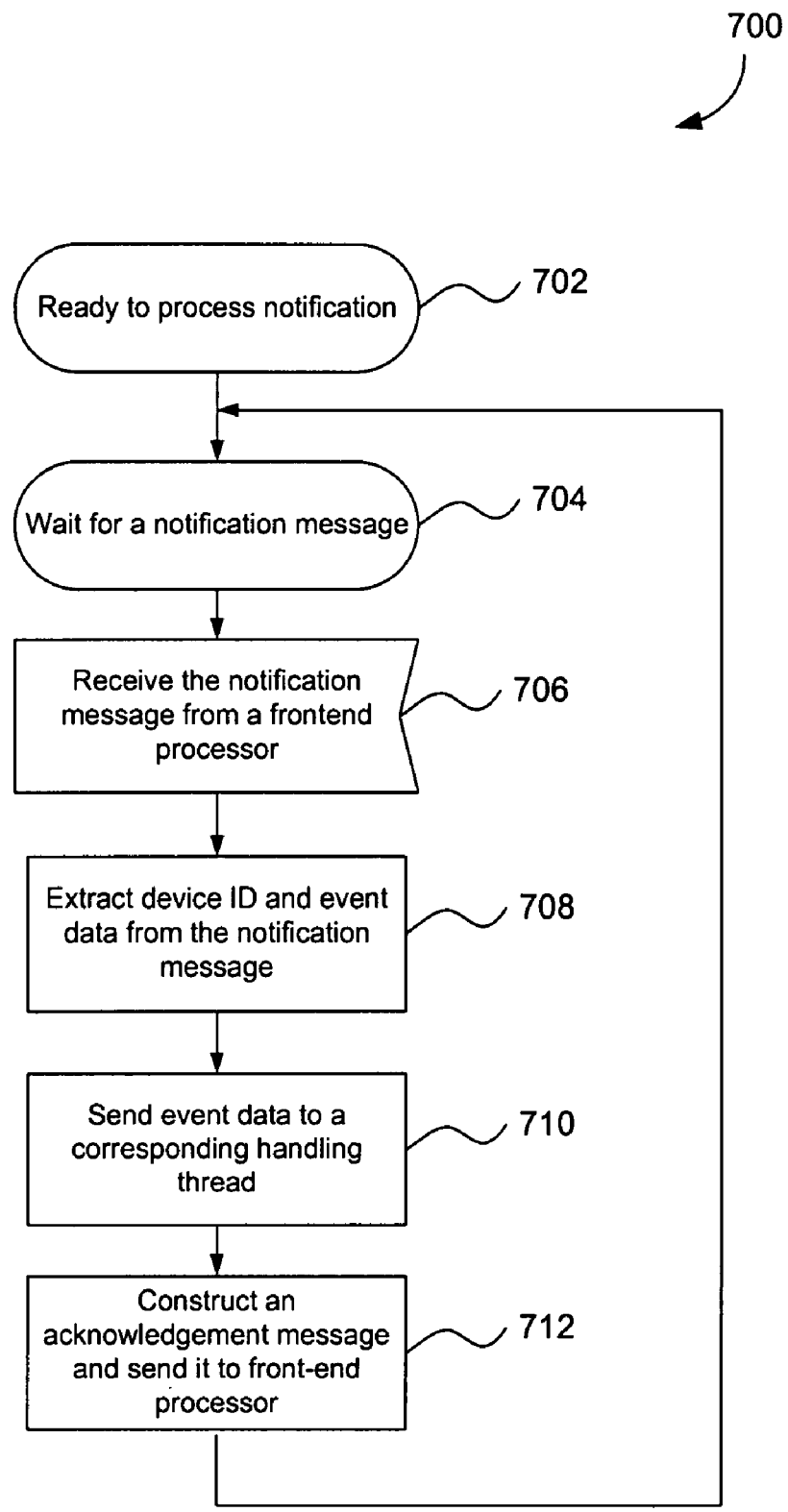
FIG. 7 is a flowchart of a back-end processor receive notification process.

FIG. 7 is a flowchart of a receive notification process 700 in the back-end processor 254. In step 702, the receive notification process 700 is ready to process a notification. In step 704, the back-end processor 254 loops while waiting for the notification message 406 from the front-end processor 252. In step 706, the back-end processor 254 receives a message from the front-end processor 252. In step 708, once the back-end processor 254 receives the notification message 406, the back-end processor 254 extracts a device ID and related event data from the notification message 406. In step 710, the back-end processor 254 sends event data to a corresponding handling thread or process. In step 712, the back-end processor 254 constructs an acknowledgment message 408 and sends it to the front-end processor 252 in order to acknowledge that the back-end processor 254 has successfully received the notification message 406.

Figure 8:
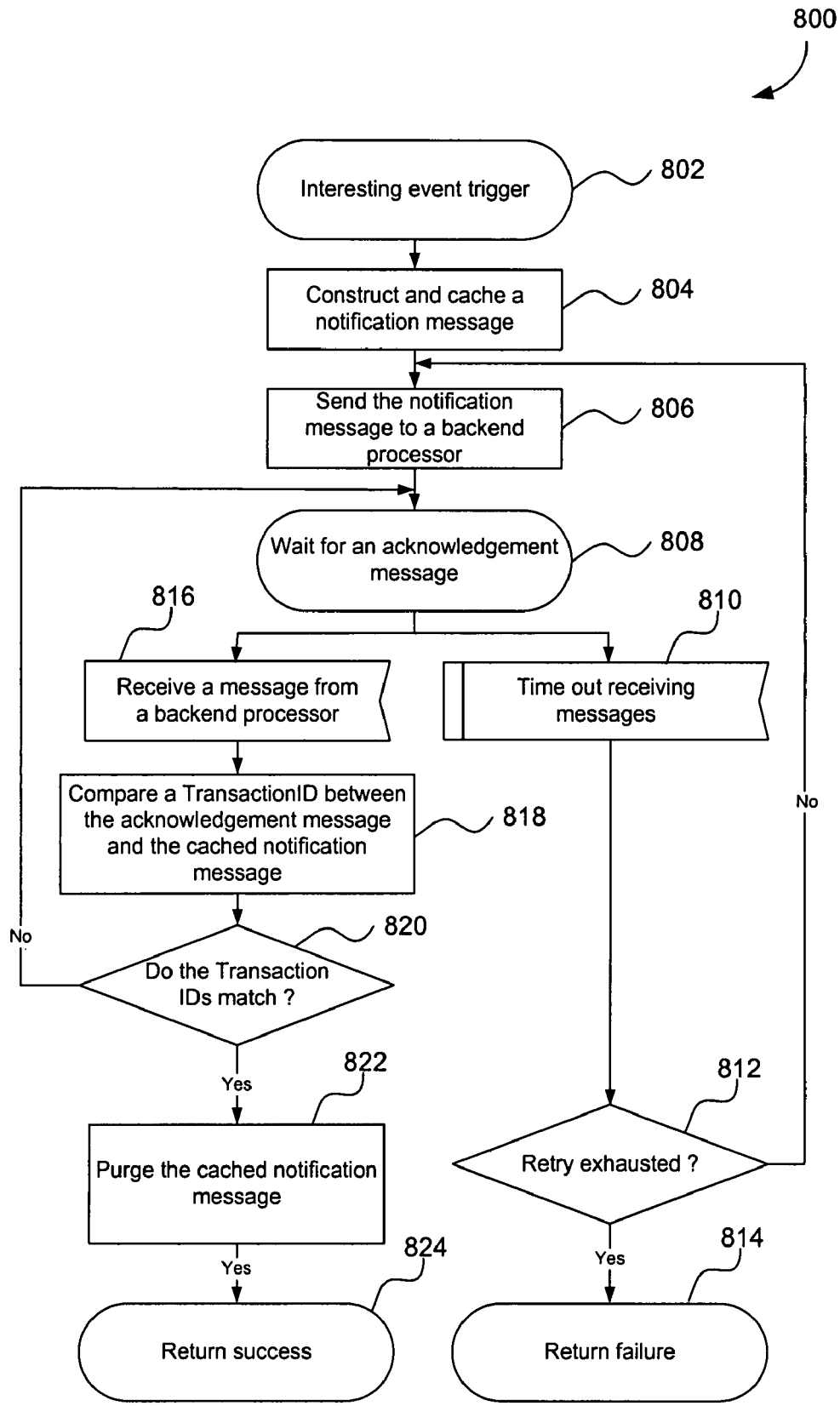
FIG. 8 is a flowchart of a front-end processor send notification process.

FIG. 8 is a flowchart of a send notification process 800 in the front-end processor 252. In step 802, an event, such as "loss of lock" of a channel, triggers a requirement for the notification message 406. In step 804, the front-end processor 252 constructs and caches the notification message 406 to be sent to the back-end processor 254. The notification message 406 includes a device ID indicating a source of the event, as well as any data associated with that event. In step 806, the front-end processor 252 sends the notification message 406 to the back-end processor 254. In step 808, the front-end processor 252 waits for the acknowledgement message 408 from the back-end processor 254. In step 810, the front-end processor 252 will timeout if the acknowledgement message 408 is not received in a predetermined period of time. In case of a timeout, the front-end processor 252 will resend the cached notification message 406 for a fixed number of retries. In step 812, if the front-end processor 252 has exhausted the number of retries, the send notification process 800 will fail. In step 814, the send notification process 800 returns the failure status to its caller.

In step 816, the front-end processor 252 receives the acknowledgement message 408 from the back-end processor 254. In step 818, the front-end processor 252 extracts the transaction ID from the acknowledgement message 408. In step 820, the front-end processor 252 compares the transaction ID from the acknowledgement message 408 with the transaction ID from the cached notification message 406. If there is a match, the cached message is purged in step 822 and the transaction is successfully completed and a success status is returned in step 824. If there is no match in step 820, front-end processor 252 repeats step 808 and continues waiting for the acknowledgement message 408.

(b) Message Format, Functions, and Structure

The remote front-end control protocol has four types of messages: a request, a response, a notification and an acknowledgement, as discussed above. Each message has a fixed-length header and a variable length body. The length and the content of the body varies dependent on the information in the body.

Every data field in a message is a 32-bit unsigned integer in a network byte order. Table 1 shows an exemplary layout of the request message. Table 2 shows an exemplary layout of the response message. Table 3 shows an exemplary layout of the notification message. Table 4 shows an exemplary layout of the acknowledgement message.

TABLE 1

Request

| Octet Offset | Field Name | Length (in octets) |
| --- | --- | --- |
| 0 | Length | 4 |
| 4 | Version | 4 |
| 8 | TransactionID | 4 |
| 12 | Type | 4 |
| 16 | OperationID | 4 |
| 20 | Operation Parameter | N |

TABLE 2

Response

| Octet Offset | Field Name | Length (in octets) |
| --- | --- | --- |
| 0 | Length | 4 |
| 4 | Version | 4 |
| 8 | TransactionID | 4 |
| 12 | Type | 4 |
| 16 | ReturnCode | 4 |
| 20 | Operation Result | N |

TABLE 3

Notification

| Octet Offset | Field Name | Length (in octets) |
| --- | --- | --- |
| 0 | Length | 4 |
| 4 | Version | 4 |
| 8 | TransactionID | 4 |
| 12 | Type | 4 |
| 16 | DeviceID | 4 |
| 20 | Event Data | N |

TABLE 4

Acknowledgement

| Octet Offset | Field Name | Length (in octets) |
| --- | --- | --- |
| 0 | Length | 4 |
| 4 | Version | 4 |
| 8 | TransactionID | 4 |
| 12 | Type | 4 |
| 16 | DeviceID | 4 |

The first four fields are the same among all messages. A "Length" field is optional. It is intended for cases where a transport service does not provide length information, such as TCP. A "Version" field contains a current version number of software running on the back-end processor 254 and the front-end processor 252. The version fields need to match in order to carry out a communication. A "TransactionID" field identifies a unique transaction between the back-end processor 254 and the front-end processor 252. The "TransactionID" field is generated randomly for each transaction. A "Type" field identifies a message type: request, response, notification, or acknowledgement. Exemplary values for the type field are listed in Table 5.

TABLE 5

Message Type Values

| Value | Message Type |
|---|---|
| 0 | REQUEST |
| 1 | RESPONSE |
| 2 | NOTIFICATION |
| 3 | ACKNOWLEDGEMENT |

In a response message, a "ReturnCode" field informs the back-end processor 254 whether a requested operation has succeeded. If the "ReturnCode" is zero, there is a successful return. Otherwise, the requested operation has failed and the "ReturnCode" contains a bitmap indicating an error condition. Table 6 defines the example "ReturnCode" values and the bitmap.

TABLE 6

ReturnCode Values

| ReturnCode in HEX | Notes |
|---|---|
| 0x00000000 | Requested operation has succeeded |
| 0x00000001 | Unknown error |
| 0x00000002 | Invalid parameters |
| 0x00000004 | Device not ready |
| 0x00000008 | Resource shortage |

In a notification message, a "DeviceID" field notifies the back-end processor 254 which front-end circuit has generated an event. Table 7 defines exemplary valid devices.

TABLE 7

DeviceID Values

| DeviceID | Device Name |
|---|---|
| 1 | Upstream Transmitter |
| 2 | Out-of-Band (OOB) demodulator |
| 10 | Downstream In-band Demodulator 0 |
| 11 | Downstream In-band Demodulator 1 |
| 12 | Downstream In-band Demodulator 2 |
| 20 | In-band Tuner 0 |
| 21 | In-band Tuner 1 |
| 22 | In-band Tuner 2 |
| 23 | Out-of-band Tuner |

An "Event Data" field tells the back-end processor 254 which event has occurred on a particular device. For a downstream channel, the "Event Data" is a 32-bit unsigned integer. Each bit in the "Event Data" field has a definition. Table 8 defines example events for a downstream channel. The "Event Data" bits are bitmaps that may be "OR"ed.

TABLE 8

Events for DS channels

| Bit number in Event | Description |
|---|---|
| 31 | LockStatus Event, which indicates to the back-end processor that the lock status has changed. |
| 16-30 | Reserved. |
| 15 | 0: QAM is not locked. 1: QAM is locked. |
| 14 | 0: FEC is not locked. 1: FEC is locked. |
| 0-13 | Reserved. |

In a request message, an "OperationID" (OID) field identifies an operation the back-end processor 254 requests. Table 9 defines the example "OperationID" and tables 10 to 39 describe an example "OperationID" data structure.

TABLE 9

Request Operations

| OID | Operation Name | Operation Description |
|---|---|---|
| 0 | Reserved | Not used for normal operations. |
| 1 | InitSession | Initialize a new session. This allows the front-end processor to perform a one-time initialization. |
| 2 | GetVersion | Get the version of the software running on the front-end processor |
| 3 | GetTotalChannels | Get the number of total in-band downstream channels |
| 4 | OpenChannel | Open an in-band downstream channel. This reserves an in-band downstream channel for the back-end processor to use. |
| 5 | CloseChannel | Close an in-band downstream channel. This releases an in-band downstream channel that back-end processor has used. |
| 6 | GetChStatus | Get a status of an in-band downstream channel. |
| 7 | DsAcquire | Tune and acquire an in-band downstream channel. |
| 8 | EnPowerSave | Enable a power save mode on front-end device. |
| 9 | GetSoftDecision | Get the most recent 16 I/Q soft decisions on an inband channel. |
| 10 | GetLockStatus | Get a lock status of a downstream channel. |
| 11 | OpenTuner | Open an inband tuner device. This reserves a tuner for back-end to use. |
| 12 | CloseTuner | Close an inband tuner device. This releases a tuner for back-end to use. |
| 13 | SetTunerFreqency | Tune an in-band tuner to a certain frequency. |

TABLE 9-continued

Request Operations

| OID | Operation Name | Operation Description |
|---|---|---|
| 14 | OobOpenTuner | Open an out-of-band tuner device. |
| 15 | OobCloseTuner | Close an out-of-band tuner device. |
| 16 | OobSetTunerFrequency | Tune an out-of-band tuner to a certain frequency. |
| 17 | OobOpenChannel | Open an out-of-band channel. |
| 18 | OobCloseChannel | Close an out-of-band channel. |
| 19 | OobAcquire | Acquire an out-of-band channel. |
| 20 | OobGetStatus | Get a status of an out-of-band channel. |
| 21 | OobGetLockStatus | Get a lock status of an out-of-band channel. |
| 22 | OobSetSpectrum | Set spectral inversion of an out-of-band channel. |
| 23 | UsOpenChannel | Open an upstream channel. |
| 24 | UsCloseChannel | Close an upstream channel. |
| 25 | UsSetOperationMode | Set the transmission mode of an upstream channel. |
| 26 | UsSetSymbolRate | Set the symbol rate of an upstream channel. |
| 27 | UsSetRfFrequency | Set upstream transmitter frequency. |
| 28 | UsSetPowerLevel | Set upstream transmission power level. |
| 29 | UsGetStatus | Get status of the upstream transmitter. |
| 30 | UsSetPreamblePattern | Set preamble pattern for an upstream transmission. |

TABLE 10

Parameters and Results for InitSession

| OID | P/R | Offset | Name | Len | Description |
|---|---|---|---|---|---|
| 1 | Parameters | None | | | |
|   | Results | None | | | |

TABLE 11

Parameters and Results for GetVersion

| OID | P/R | Offset | Name | Len | Description |
|---|---|---|---|---|---|
| 2 | Parameters | None | | | |
|   | Results | 20 | MajorVersion | 4 | Major SW version |
|   |         | 24 | MinorVersion | 4 | Minor SW version |

TABLE 12

Parameters and Results for GetTotalChannels

| OID | P/R | Offset | Name | Len | Description |
|---|---|---|---|---|---|
| 3 | Parameters | None | | | |
|   | Results | 20 | Num | 4 | Number of total downstream channels |

TABLE 13

Parameters and Results for OpenChannel

| OID | P/R | Offset | Name | Len | Description |
|---|---|---|---|---|---|
| 4 | Parameters | 20 | DeviceID | 4 | Device ID for desired donstream demodulator |
|   | Results | | | None | |

TABLE 14

Parameters and Results for CloseChannel

| OID | P/R | Offset | Name | Len | Description |
|---|---|---|---|---|---|
| 5 | Parameters | 20 | DeviceID | 4 | Device ID for desired downstream demodulator |
|   | Results | | | None | |

TABLE 15

Parameters and Results for GetChStatus

| OID | P/R | Offset | Name | Len | Description |
|---|---|---|---|---|---|
| 6 | Parameters | 20 | DeviceID | 4 | Device ID for desired downstream demodulator |

TABLE 15-continued

Parameters and Results for GetChStatus

| OID | P/R | Offset | Name | Len | Description |
|---|---|---|---|---|---|
| | Results | 20 | DeviceID | 4 | Device ID in request |
| | | 24 | PSaveMode | 4 | 0: Power save mode is off; 1: Power save mode is on. |
| | | 28 | ModType | 4 | Modulation Type |
| | | 32 | IfFreq | 4 | IF frequency in Hz |
| | | 36 | iSymbolRate | 4 | Input Symbol Rate |
| | | 40 | FecLocked | 4 | 0: FEC is locked. 1: FEC is not locked. |
| | | 44 | QamLocked | 4 | 1: QAM is locked. 0: QAM is not locked. |
| | | 48 | cFecCount | 4 | Corrected FEC error counter value |
| | | 52 | uFecCount | 4 | Uncorrect FEC error couter value |
| | | 56 | SNR | 4 | SNR estimate |
| | | 60 | intAGC | 4 | Internal AGC value |
| | | 64 | extAGC | 4 | External AGC value |
| | | 68 | freqOffset | 4 | Freqency offset |
| | | 72 | phaseOffset | 4 | Phase offset |
| | | 76 | rSymbolReate | 4 | Recovered Symbol Rate |
| | | 80 | iDepth | 4 | Interleaver Depth |

TABLE 16

Parameters and Results for DsAcquire

| OID | P/R | Offset | Name | Len | Description |
|---|---|---|---|---|---|
| 7 | Parameters | 20 | DeviceID | 4 | Device ID for desired downstream demodulator |
| | | 24 | modType | 4 | 0: QAM16 Annex A<br>1: QAM32 Annex A<br>2: QAM64 Annex A<br>3: QAM128 Annex A<br>4: QAM256 Annex A<br>5: QAM512 Annex A<br>6: QAM1024 Annex A<br>7: QAM2048 Annex A<br>8: QAM4096 Annex A<br>9: QAM16 Annex B<br>10: QAM32 Annex B<br>11: QAM64 Annex B<br>12: QAM128 Annex B<br>13: QAM256 Annex B<br>14: QAM512 Annex B<br>15: QAM1024 Annex B<br>16: QAM2048 Annex B<br>17: QAM4096 Annex B |
| | | 28 | symbolRate | 4 | Input symbol rate |
| | Results | | | None | |

TABLE 17

Parameters and Results for EnPowerSave

| OID | P/R | Offset | Name | Len | Description |
|---|---|---|---|---|---|
| 8 | Parameters | 20 | DeviceID | 4 | Device ID for desired front-end device |
| | Results | | | None | |

TABLE 18

Parameters and Results for GetSoftDecison

| OID | P/R | Offset | Name | Len | Description |
|---|---|---|---|---|---|
| 9 | Parameters | 20 | DeviceID | 4 | Device ID for a downstream demodulator |

TABLE 18-continued

Parameters and Results for GetSoftDecison

| OID | P/R | Offset | Name | Len | Description |
|---|---|---|---|---|---|
| | Results | 20 | DeviceID | 4 | Device ID in request. |
| | | 24 | $I_0$ | 4 | I value of symbol 0 |
| | | 28 | $I_1$ | 4 | I value of symbol 1 |
| | | 32 | $I_2$ | 4 | I value of symbol 2 |
| | | 36 | $I_3$ | 4 | I value of symbol 3 |
| | | 40 | $I_4$ | 4 | I value of symbol 4 |
| | | 44 | $I_5$ | 4 | I value of symbol 5 |
| | | 48 | $I_6$ | 4 | I value of symbol 6 |
| | | 52 | $I_7$ | 4 | I value of symbol 7 |
| | | 56 | $I_8$ | 4 | I value of symbol 8 |
| | | 60 | $I_9$ | 4 | I value of symbol 9 |
| | | 64 | $I_{10}$ | 4 | I value of symbol 10 |
| | | 68 | $I_{11}$ | 4 | I value of symbol 11 |
| | | 72 | $I_{12}$ | 4 | I value of symbol 12 |
| | | 76 | $I_{13}$ | 4 | I value of symbol 13 |

TABLE 18-continued

Parameters and Results for GetSoftDecison

| OID | P/R | Offset | Name | Len | Description |
|---|---|---|---|---|---|
| | | 80 | $I_{14}$ | 4 | I value of symbol 14 |
| | | 84 | $I_{15}$ | 4 | I value of symbol 15 |
| | | 88 | $Q_0$ | 4 | Q value of symbol 0 |
| | | 92 | $Q_1$ | 4 | Q value of symbol 1 |
| | | 96 | $Q_2$ | 4 | Q value of symbol 2 |
| | | 100 | $Q_3$ | 4 | Q value of symbol 3 |
| | | 104 | $Q_4$ | 4 | Q value of symbol 4 |
| | | 108 | $Q_5$ | 4 | Q value of symbol 5 |
| | | 112 | $Q_6$ | 4 | Q value of symbol 6 |
| | | 116 | $Q_7$ | 4 | Q value of symbol 7 |
| | | 120 | $Q_8$ | 4 | Q value of symbol 8 |
| | | 124 | $Q_9$ | 4 | Q value of symbol 9 |
| | | 128 | $Q_{10}$ | 4 | Q value of symbol 10 |
| | | 132 | $Q_{11}$ | 4 | Q value of symbol 11 |
| | | 136 | $Q_{12}$ | 4 | Q value of symbol 12 |
| | | 140 | $Q_{13}$ | 4 | Q value of symbol 13 |
| | | 144 | $Q_{14}$ | 4 | Q value of symbol 14 |
| | | 148 | $Q_{15}$ | 4 | Q value of symbol 15 |

TABLE 19

Parameters and Results for GetLockStatus

| OID | P/R | Offset | Name | Len | Description |
|---|---|---|---|---|---|
| 10 | Parameters | 20 | DeviceID | 4 | Device ID for a downstream demodulator |
| | Results | 20 | DeviceID | 4 | Device ID in request |
| | | 24 | FecLock | 4 | 1: FEC is locked. 0: FEC is not locked. |
| | | 28 | QamLock | 4 | 1: QAM is locked. 0: QAM is not locked. |

TABLE 20

Parameters and Results for OpenTuner

| OID | P/R | Offset | Name | Len | Description |
|---|---|---|---|---|---|
| 11 | Parameters | 20 | DeviceID | 4 | Device ID for desired in-band tuner |
| | Results | | None | | |

TABLE 21

Parameters and Results for CloseTuner

| OID | P/R | Offset | Name | Len | Description |
|---|---|---|---|---|---|
| 12 | Parameters | 20 | DeviceID | 4 | Device ID for desired in-band tuner |
| | Results | | None | | |

TABLE 22

Parameters and Results for SetTunerFreqency

| OID | P/R | Offset | Name | Len | Description |
|---|---|---|---|---|---|
| 13 | Parameters | 20 | DeviceID | 4 | Device ID for desired in-band tuner |
| | | 24 | rfFreq | 4 | RF frequency to tune to in Herz |

TABLE 22-continued

Parameters and Results for SetTunerFreqency

| OID | P/R | Offset | Name | Len | Description |
|---|---|---|---|---|---|
| | | 28 | Mode | 4 | 0: digital 1: analog |
| | Results | | None | | |

TABLE 23

Parameters and Results for OobOpenTuner

| OID | P/R | Offset | Name | Len | Description |
|---|---|---|---|---|---|
| 14 | Parameters | 20 | DeviceID | 4 | Device ID for OOB tuner |
| | Results | | None | | |

TABLE 24

Parameters and Results for OobCloseTuner

| OID | P/R | Offset | Name | Len | Description |
|---|---|---|---|---|---|
| 15 | Parameters | 20 | DeviceID | 4 | Device ID for GOB demodulator |
| | Results | | None | | |

TABLE 25

Parameters and Results for OobSetTunerFreqency

| OID | P/R | Offset | Name | Len | Description |
|---|---|---|---|---|---|
| 16 | Parameters | 20 | DeviceID | 4 | Device ID for OOB demodulator |
| | | 24 | rfFreq | 4 | RF frequency to tune to in Herz |
| | Results | | None | | |

TABLE 26

Parameters and Results for OobOpenChannel

| OID | P/R | Offset | Name | Len | Description |
|---|---|---|---|---|---|
| 17 | Parameters | 20 | DeviceID | 4 | Device ID for OOB demodulator |
| | | 24 | enableFEC | 4 | 1: Enable Forward Error Correction (FEC) 2: Disable FEC. |
| | Results | | None | | |

TABLE 27

Parameters and Results for OobCloseChannel

| OID | P/R | Offset | Name | Len | Description |
|---|---|---|---|---|---|
| 18 | Parameters | 20 | DeviceID | 4 | Device ID for OOB demodulator |
| | Results | | None | | |

TABLE 28

Parameters and Results for OobAcquire

| OID | P/R | Offset | Name | Len | Description |
|---|---|---|---|---|---|
| 19 | Parameters | 20 | DeviceID | 4 | Device ID for OOB demodulator |
| | | 24 | modType | 4 | 0: QPSK in Annex A<br>1: DVS178 in Annex A |
| | | 28 | symbolRate | 4 | Input symbol rate in symbol per second |
| | Results | | | None | |

TABLE 29

Parameters and Results for OobGetStatus

| OID | P/R | Offset | Name | Len | Description |
|---|---|---|---|---|---|
| 20 | Parameters | 20 | DeviceID | 4 | Device ID for OOB demodulator |
| | Results | 20 | DeviceID | 4 | Device ID in request |
| | | 24 | IfFreq | 4 | IF frequency in Hertz |
| | | 28 | sysXtalFreq | 4 | System crystal frequency in Hertz |
| | | 32 | SymbolRate | 4 | Recovered Symbol Rate in symbol per second |
| | | 36 | FecLocked | 4 | 0: FEC is locked.<br>1: FEC is not locked. |
| | | 40 | QamLocked | 4 | 1: QAM is locked.<br>0: QAM is not locked. |
| | | 44 | snrEstimate | 4 | Signal to Noise Ration (SNR) estimate |
| | | 48 | intAGC | 4 | Internal Automatic Gain Control (AGC) value |
| | | 52 | extAGC | 4 | External AGC value |
| | | 56 | freqOffset | 4 | Frequency offset |
| | | 60 | phaseOffset | 4 | Phase offset |
| | | 64 | correctedCount | 4 | Corrected FEC error counter value |

TABLE 30

Parameters and Results for OobGetLockStatus

| OID | P/R | Offset | Name | Len | Description |
|---|---|---|---|---|---|
| 21 | Parameters | 20 | DeviceID | 4 | Device ID for OOB demodulator |
| | Results | 20 | FecLock | 4 | 1: FEC is locked.<br>0: FEC is not locked. |
| | | 24 | QamLock | 4 | 1: QAM is locked.<br>0: QAM is not locked. |

TABLE 31

Parameters and Results for OobSetSpectrum

| OID | P/R | Offset | Name | Len | Description |
|---|---|---|---|---|---|
| 22 | Parameters | 20 | DeviceID | 4 | Device ID for OOB demodulator |
| | | 24 | spectrum | 4 | 0: automatic spectrum inversion.<br>1: no spectrum inversion<br>2: spectrum inverted |
| | Results | | | None | |

TABLE 32

Parameters and Results for UsOpenChannel

| OID | P/R | Offset | Name | Len | Description |
|---|---|---|---|---|---|
| 23 | Parameters | 20 | DeviceID | 4 | Device ID for upstream trasmitter |
| | | 24 | xtalFreq | 4 | Crystal frequency for upstream transmitter |
| | Results | | | None | |

TABLE 33

Parameters and Results for UsCloseChannel

| OID | P/R | Offset | Name | Len | Description |
|---|---|---|---|---|---|
| 24 | Parameters | 20 | DeviceID | 4 | Device ID for upstream trasmitter |
| | Results | | | None | |

TABLE 34

Parameters and Results for UsSetOperationMode

| OID | P/R | Offset | Name | Len | Description |
|---|---|---|---|---|---|
| 25 | Parameters | 20 | DeviceID | 4 | Device ID for upstream trasmitter |
| | | 24 | operMode | 4 | 0: Annex A mode<br>1: DVS178 mode<br>2: DOCSIS mode<br>3: POD mode |
| | Results | | | None | |

TABLE 35

Parameters and Results for UsSetSymbolRate

| OID | P/R | Offset | Name | Len | Description |
|---|---|---|---|---|---|
| 26 | Parameters | 20 | DeviceID | 4 | Device ID for upstream trasmitter |
| | | 24 | symbolRate | 4 | Symbol rate in symbol per second |
| | Results | | | None | |

TABLE 36

Parameters and Results for UsSetRfFreq

| OID | P/R | Offset | Name | Len | Description |
|---|---|---|---|---|---|
| 27 | Parameters | 20 | DeviceID | 4 | Device ID for upstream transmitter |

TABLE 36-continued

Parameters and Results for UsSetRfFreq

| OID | P/R | Offset | Name | Len | Description |
|---|---|---|---|---|---|
|  |  | 24 | xmitFreq | 4 | OOB frequency for upstream transmitter in Herz |
|  | Results |  |  | None |  |

TABLE 37

Parameters and Results for UsSetPowerLevel

| OID | P/R | Offset | Name | Len | Description |
|---|---|---|---|---|---|
| 28 | Parameters | 20 | DeviceID | 4 | Device ID for upstream trasmitter |
|  |  | 24 | powerLevel | 4 | Power level in hundredth of dBmV |
|  | Results |  |  | None |  |

TABLE 38

Parameters and Results for UsGetStatus

| OID | P/R | Offset | Name | Len | Description |
|---|---|---|---|---|---|
| 29 | Parameters | 20 | DeviceID | 4 | Device ID for upstream trasmitter |
|  | Results | 20 | powerMode | 4 | 0: power save disabled<br>1: power save enabled |
|  |  | 24 | operMode | 4 | 0: Annex A mode<br>1: DVS178 mode<br>2: DOCSIS mode<br>3: POD mode |
|  |  | 28 | xtalFreq | 4 | crystal frequency in Herz |
|  |  | 32 | powerLevel | 4 | Power level in hundredth of dBmV |
|  |  | 36 | rfFreq | 4 | Transmitter frequency in Herz. |
|  |  | 40 | symbolRate | 4 | Symbol rate in symbol per second. |

TABLE 39

Parameters and Results for UsSetPreamblePattern

| OID | P/R | Offset | Name | Len | Description |
|---|---|---|---|---|---|
| 30 | Parameters | 20 | DeviceID | 4 | Device ID for upstream trasmitter |
|  |  | 24 | patternSize | 4 | preamble Pattern Size |
|  |  | 28 | preamblePattern | patternSize | Preamble pattern |
|  | Results |  |  | None |  |

(c) Reliability, Flow Control and Message Transport Service

The remote front-end control protocol has built-in reliability control. As illustrated in (a) MESSAGE PROCESSING, the remote front-end control protocol caches the transmitted message and re-transmits it if a timeout occurs before the corresponding response message is successfully received, 504, 510, 518, 804, 810 and 812. The remote front-end control protocol also uses stop-and-wait flow control. As illustrated in (a) MESSAGE PROCESSING, the remote front-end control protocol waits for the response message after a request message has been transmitted, 506, 508, 806, 808.

The remote front-end control protocol may use at least one of several transport protocols as a message transport service. The remote front-end control protocol does not require reliable transport service because of its built-in reliability control. The transport protocols may include a user datagram protocol (UDP), a transmission control protocol (TCP), a point to point protocol over Ethernet (PPPoE), and a universal serial bus (USB). When a transport service is used, the remote front-end control message needs to be mapped into the payload of the transport protocol. The following sections list the message mappings when UDP and USB are used as the transport protocol.

When UDP is used as the transport protocol, since it provides packet length information, the 'Length' field in the message header may be removed. Tables 40-43 show frame layouts when UDP is used as the transport protocol.

TABLE 40

UDP based Request

| Octet Offset | Field Name | Length (in octets) |
|---|---|---|
| 0 | Ethernet Header | 14 |
| 14 | IP header | 20 |
| 34 | UDP header | 8 |
| 42 | Version | 4 |
| 46 | TransactionID | 4 |
| 50 | Type | 4 |
| 54 | OperationID | 4 |
| 58 | Operation Parameter | N |

TABLE 41

UDP based Response

| Octet Offset | Field Name | Length (in octets) |
|---|---|---|
| 0 | Ethernet Header | 14 |
| 14 | IP header | 20 |
| 34 | UDP header | 8 |
| 42 | Version | 4 |
| 46 | TransactionID | 4 |
| 50 | Type | 4 |
| 54 | ReturnCode | 4 |
| 58 | Operation Result | N |

TABLE 42

UDP based Notification

| Octet Offset | Field Name | Length (in octets) |
|---|---|---|
| 0 | Ethernet Header | 14 |
| 14 | IP header | 20 |
| 34 | UDP header | 8 |
| 42 | Version | 4 |
| 46 | TransactionID | 4 |
| 50 | Type | 4 |
| 54 | DeviceID | 4 |
| 58 | Event Data | N |

TABLE 43

UDP based Acknowledgement

| Octet Offset | Field Name | Length (in octets) |
|---|---|---|
| 0 | Ethernet Header | 14 |
| 14 | IP header | 20 |
| 34 | UDP header | 8 |
| 42 | Version | 4 |
| 46 | TransactionID | 4 |
| 50 | Type | 4 |
| 54 | DeviceID | 4 |

When USB is used to interconnect the front-end and back-end processors 252, 254, one processor will be a USB host; the other will be a USB device. There is no requirement which processor needs to be USB host, but for illustrative purpose, in the following discussion, we assume the back-end processor 254 is the USB host and the front-end processor 252 is the USB device. The USB device can be configured by using Abstract Control Model for Communication Class Device (CDC), as defined in USB Class Definition for Communication Devices Version 1.1. USB class-specific requests for Communication Device can be used to carry the remote front-end control protocol. The CDC class specific device request 'SendEncapsulatedCommand' can be used to transfer Request and Acknowledgement. The CDC class specific device request 'GetEncapsulatedResponse' can be used to transfer Response and Notification. Tables 44-47 show the layout mapping when USB is used.

TABLE 44

CDC SendEncapsulatedCommand based Request

| Octet Offset | Field Name | Length (in octets) |
|---|---|---|
| 0 | bmRequestType | 1 |
| 1 | bRequest | 1 |
| 2 | wValue | 2 |
| 4 | wIndex | 2 |
| 6 | wLength | 2 |
| 8 | Version | 4 |
| 12 | TransactionID | 4 |
| 16 | Type | 4 |
| 20 | OperationID | 4 |
| 24 | Operation Parameter | N |

TABLE 45

CDC GetEncapsulatedResponse based Response

| Octet Offset | Field Name | Length (in octets) |
|---|---|---|
| 0 | bmRequestType | 1 |
| 1 | bRequest | 1 |
| 2 | wValue | 2 |
| 4 | wIndex | 2 |
| 6 | wLength | 2 |
| 8 | Version | 4 |
| 12 | TransactionID | 4 |
| 16 | Type | 4 |
| 20 | ReturnCode | 4 |
| 24 | Operation Result | N |

TABLE 46

CDC GetEncapsulatedResponse based Notification

| Octet Offset | Field Name | Length (in octets) |
|---|---|---|
| 0 | bmRequestType | 1 |
| 1 | bRequest | 1 |
| 2 | wValue | 2 |
| 4 | wIndex | 2 |
| 6 | wLength | 2 |
| 8 | Version | 4 |
| 12 | TransactionID | 4 |
| 16 | Type | 4 |
| 20 | DeviceID | 4 |
| 24 | EventData | N |

TABLE 47

CDC SendEncapsulatedCommand based Acknowledgement

| Octet Offset | Field Name | Length (in octets) |
|---|---|---|
| 0 | bmRequestType | 1 |
| 1 | bRequest | 1 |
| 2 | wValue | 2 |
| 4 | wIndex | 2 |
| 6 | wLength | 2 |
| 8 | Version | 4 |
| 12 | TransactionID | 4 |
| 16 | Type | 4 |
| 20 | DeviceID | 4 |

(d) Exemplary Sequence of Transactions

Figure 9:
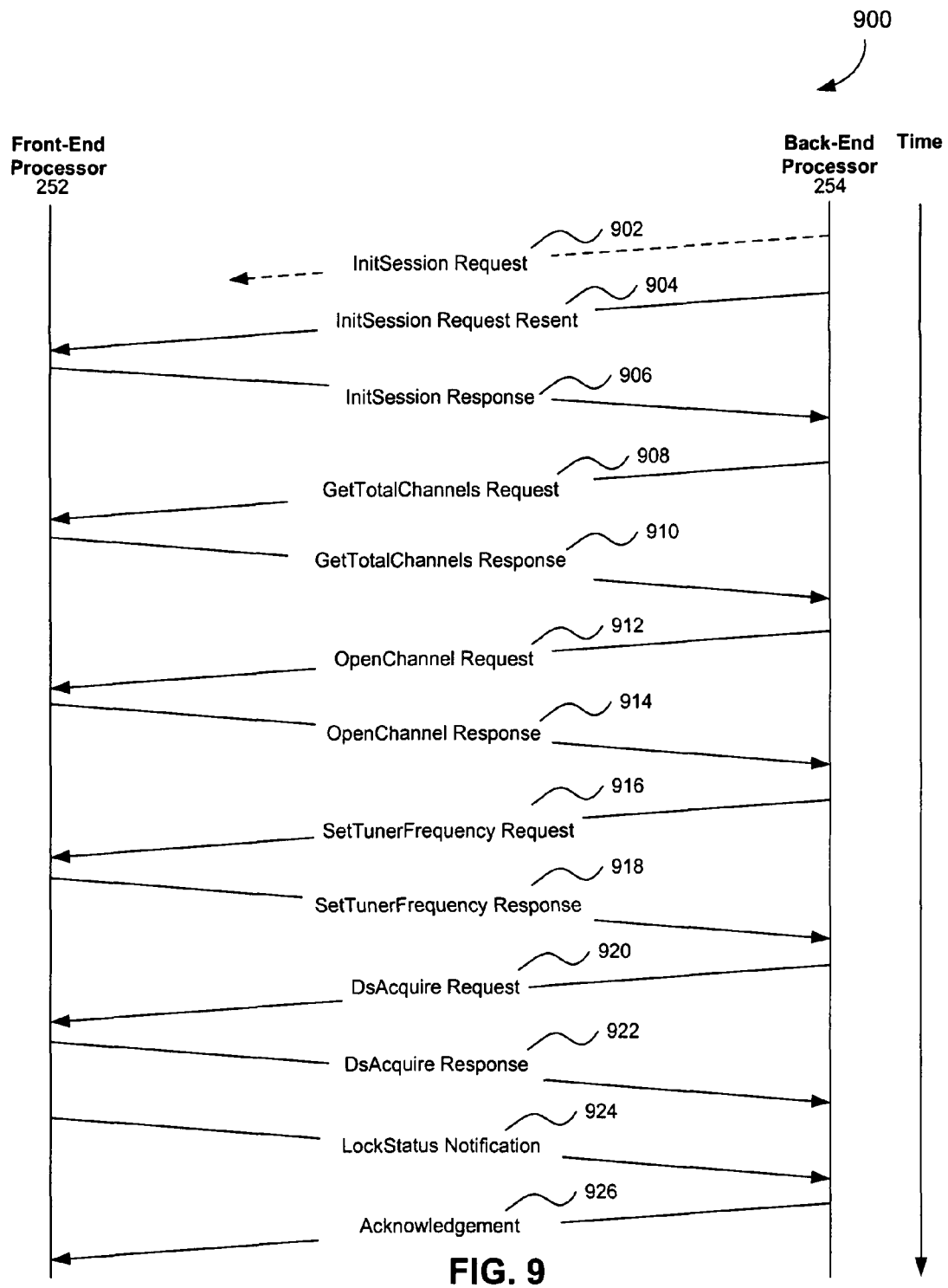
FIG. 9 shows an exemplary sequence of transaction between a front-end processor and a back-end processor.

FIG. 9 shows an exemplary sequence of transactions 900 between the front-end processor 252 and the back-end processor 254. The exemplary sequence of transactions 900 shown includes transactions that acquire a QAM channel.

First, the back-end processor 254 sends an "InitSession" request 902 to the front-end processor 252. The back-end processor 254 also caches the request message 902 and starts a timer for timeout. The "InitSession" is somehow lost, and eventually the timer expires. After expiration of the timer, the back-end processor 254 then re-transmits the cached "InitSession" request 904. This time the message goes through.

The front-end processor 252 receives the request and initializes an internal session data structure based on the "InitSession" request 904. The front-end processor 252 then replies to the back-end processor 254 with a response message 906 having a "ReturnCode" equal to 0, which indicates operation success.

Upon receiving the response message 906, the back-end processor 254 verifies a transaction ID in both the response message 906 and its cached request message 902. If the transaction IDs match, the back-end processor 254 also checks the "ReturnCode" in the response message 906.

After verifying the "InitSession" request 904 is successful, the back-end processor 254 sends another request of "GetTotalChannels" 908. In response to the "GetTotalChannels" 908 request, the front-end processor 252 returns 2 in the "Num" field in the response message 910 along with a successful "ReturnCode."

After verifying the "GetTotalChannels" 908 request is successful by checking the "TransactionID" and "ReturnCode" in the response message 910, the back-end processor 254 sends a request "OpenChannel" 912. The back-end processor 254 also specifies 11 (Downstream In-band Demodulator 1, 281) in the "DeviceID" field in the "OpenChannel" request message 912 in order to open downstream channel 1 in the front-end 202, 302. Upon receiving the "OpenChannel"

request message 912, the front-end processor 252 reserves resources for the requested downstream channel, and then sends a response message 914.

After verifying the "OpenChannel" request 912 is successful by checking the "TransactionID" and "ReturnCode" in the response message 914, the back-end processor 254 then sends a "SetTunerFrequency" request 916 to the front-end processor 252. In the "DeviceID" field in the "SetTunerFrequency" request, the back-end processor specifies 21 (In-band tuner 1, 280). In the "rfFreq" field, it specifies 765000000 Hz. In the "mode" field, it specifies "0". The front-end processor 252 receives the "SetTunerFrequency" message 916, parses it, then tunes in-band tuner 1 280 to 765000000 Hz, and then sends a response message 918 with a successful status back to the back-end processor 254.

After verifying the "SetTunerFrequency" request 916 is successful by checking the "TransactionID" and "ReturnCode" in response 918, the back-end processor 254 then sends a "DsAcquire" message 920 to the front-end processor 252. The "symbolRate" field in the message contains the symbol rate. The "modType" field contains the modulation type. The front-end processor 252 receives the "DsAcquire" message 920 parses its parameters that contain symbol rate and modulation type, and notifies responsible threads to perform the requested operation with the parsed parameters. The front-end processor 252 then responds 922 with success.

After verifying the "DsAcquire" request 920 is successful by checking the "TransactionID" and "ReturnCode" in response 922, the back-end processor 254 then starts waiting for events from the front-end processor 252.

Once the requested downstream channel has been acquired, the front-end processor 252 sends a notification message 924 that contains the device ID and related event data that indicates FEC and QAM lock status. The back-end processor 254 receives the notification message 924, and sends an acknowledgement message 926 to the front-end processor 252. The front-end processor 252 subsequently receives the acknowledgement message 926.

CONCLUSION

Example embodiments of the methods, systems, and components of the present invention are described herein. As noted elsewhere, these example embodiments are described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention are not limited by any of the above-described exemplary embodiments, but are defined only in accordance with the following claims and their equivalents.

What is claimed is:

1. A set-top box configured to interface with a communications medium, comprising:
a front-end portion having an input and an output coupled to said communications medium, said front-end portion having
a plurality of front-end circuits configured to receive and transmit signals over said communications medium; and
a first processor configured to control said plurality of front-end circuits;
a back-end portion coupled to said front-end portion, said back-end portion having
a plurality of back-end circuits configured to process baseband signals that correspond to said transmit and receive signals of said front-end portion; and
a second processor configured to control said back-end circuits and to provide instructions to said first processor for controlling said front-end circuits.

2. The set-top box of claim 1, further comprising a data link between said first processor and said second processor.

3. The set-top box of claim 1, wherein said plurality of front-end circuits include an RF tuner configured to down-convert a selected channel from an RF input signal received at said front-end portion input, wherein said first processor determines said selected channel based on instructions from said second processor.

4. The set-top box of claim 1, wherein said communications medium is a cable medium, wherein said plurality of front-end circuits include:
a first tuner and a first demodulator configured for cable TV reception; and
a second tuner, a second demodulator and upstream transmitter configured for Internet access;
wherein said first processor controls, based on instructions from said second processor, at least one of said first and second tuners, at least one of said first and second demodulator and said upstream transmitter.

5. The set-top box of claim 1, wherein the plurality of front-end circuits further comprises:
at least one tuner;
at least one demodulator; and
a data over cable service interface specification (DOCSIS) module.

6. The set-top box of claim 1, wherein the first processor further comprises:
an interface for coupling the first processor to the second processor; and
a port that is configured to control:
the at least one tuner;
the at least one demodulator; and
the DOCSIS module.

7. The set-top box of claim 6, wherein the first processor issues a command to the port to control at least one of the at least one tuner and the at least one demodulator based on the instructions provided to the first processor from the second processor.

8. The set-top box of claim 5, wherein the first processor, the at least one tuner, and the DOCSIS module are deposited on a common substrate.

9. The set-top box of claim 5, wherein the DOCSIS module performs a DOCSIS set-top gateway (DSG) function.

10. The set-top box of claim 6, wherein the interface is compatible with at least one of a universal serial bus and an Ethernet network.

11. The set-top box of claim 6, wherein the interface is compatible with at least one of:
a user datagram protocol;
a transmission control protocol;
an internet protocol; and
a point to point protocol over Ethernet.

12. The set-top box of claim 7, wherein the instructions provided by the second processor to the first processor include a protocol comprising of a fixed-length message header and a variable-length message body.

13. The set-top box of claim 12, wherein the protocol defines at least one of the following messages:
a request; and
a response.

14. The set-top box of claim 12, wherein the protocol defines at least one of the following messages:
a notification; and
an acknowledgement.

15. The set-top box of claim 6, wherein the first processor issues a command to the port to control an upstream transmitter.

16. The set-top box of claim 1, wherein the second processor is further configured to control the plurality of back-end circuits independent from the first processor.

17. A set-top box, comprising:
a front-end that includes:
a plurality of front-end circuits configured to receive and transmit communication signals, and
a front-end processor configured to control a first portion of the plurality of front-end circuits to support operation of a first service; and
a back-end portion that is coupled to the front-end portion, wherein the back-end portion includes:
a plurality of back-end circuits configured to process a baseband signal that corresponds to the received communication signal, and
a back-end processor configured to control the plurality of back-end circuits and to provide instructions to the front-end processor to control a second portion of the front-end circuits to support operation of a second service.

18. The set-top box of claim 17, wherein the front-end processor and the back-end processor are further configured to support substantially simultaneous operation of the first service and the second service.

19. The set-top box of claim 17, wherein the front-end processor is further configured to control the first portion of the plurality of front-end circuits to support operation of a DOCSIS service.

20. The set-top box of claim 17, wherein the back-end processor is further configured to control the second portion of the plurality of front-end circuits to support operation of a cable television service.

21. A set-top box, comprising:
a front-end that includes:
a plurality of front-end circuits configured to receive and transmit communication signals, wherein the plurality of front-end circuits includes at least one tuner configured for a first service and a data over cable service interface specification (DOCSIS) module configured for a second service, and
a front-end processor configured to control the DOCSIS module to support operation of the second service; and
a back-end portion that is coupled to the front-end portion, wherein the back-end portion includes:
a plurality of back-end circuits configured to process a baseband signal that corresponds to the received communication signal, and
a back-end processor configured to control the plurality of back-end circuits and to provide instructions to the front-end processor to control the at least one tuner to support operation of the first service.

22. The set-top box of claim 21, wherein the first service is configured for DOCSIS down-stream channel bonding and the second service is configured for cable television service.

* * * * *